(12) United States Patent
Yamamoto et al.

(10) Patent No.: US 8,128,289 B2
(45) Date of Patent: Mar. 6, 2012

(54) FLUID DYNAMIC BEARING DEVICE

(75) Inventors: Tetsuya Yamamoto, Kuwana (JP); Isao Komori, Kuwana (JP); Yoshiharu Inazuka, Kuwana (JP); Masaharu Hori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 625 days.

(21) Appl. No.: 12/304,837

(22) PCT Filed: Mar. 1, 2007

(86) PCT No.: PCT/JP2007/053882
§ 371 (c)(1),
(2), (4) Date: Dec. 15, 2008

(87) PCT Pub. No.: WO2008/001513
PCT Pub. Date: Jan. 3, 2008

(65) Prior Publication Data
US 2009/0324149 A1    Dec. 31, 2009

(30) Foreign Application Priority Data
Jun. 28, 2006  (JP) ................................. 2006-178321

(51) Int. Cl.
*F16C 32/06* (2006.01)
(52) U.S. Cl. ...................................................... 384/107
(58) Field of Classification Search .................. 384/100, 384/107, 121
See application file for complete search history.

(56) References Cited

U.S. PATENT DOCUMENTS

| 6,793,394 | B2 | 9/2004 | Gomyo et al. |
| 2003/0016891 | A1 | 1/2003 | Gomyo et al. |

FOREIGN PATENT DOCUMENTS

| JP | 9-229053 A | 9/1997 |
| JP | 2003-28147 A | 1/2003 |
| JP | 2003-269443 A | 9/2003 |
| JP | 2003-294027 A | 10/2003 |
| JP | 2005-273815 A | 10/2005 |

OTHER PUBLICATIONS

International Search Report of PCT/JP2007/053882, date of mailing May 22, 2007.
International Preliminary Report of Patentability in PCT/JP2007/053882 dated Jan. 20, 2009.
Chinese Office Action dated Feb. 12, 2010, issued in corresponding Chinese Patent Application No. 200780023973.5.
Chinese Office Action dated Jul. 12, 2011, issued in corresponding Chinese Patent Application No. 200780023973.5.

*Primary Examiner* — Thomas R Hannon
(74) *Attorney, Agent, or Firm* — Westerman, Hattori, Daniels & Adrian, LLP

(57) ABSTRACT

An outer peripheral surface (8*d*) of a bearing sleeve (8) is formed on a radially inside with respect to a first dynamic pressure generation portion (B1). In this case, it is possible to reduce a thickness of the bearing sleeve (8) while securing a first thrust dynamic pressure generating portion (B1) which has a thrust load capacity equivalent to that in a conventional case where a thrust dynamic pressure generating portion is formed in an end surface of the bearing sleeve. Accordingly, it is possible to reduce the thickness of the bearing sleeve (8) without sacrificing a bearing performance in a thrust direction. With this structure, a total amount of a lubricating oil sealed in a bearing device can be reduced, thereby reducing a capacity of a buffering function so as to downsize a sealing portion (9), and by extension, downsizing a fluid dynamic bearing device (1).

4 Claims, 5 Drawing Sheets

FLUID DYNAMIC BEARING DEVICE

BACKGROUND OF THE INVENTION

1. Field of the Invention

The present invention relates to a fluid dynamic bearing device for rotatably supporting a shaft member by means of a dynamic pressure effect of a lubricating fluid generated in a bearing gap.

2. Description of Related Art

By virtue of its high rotational precision and silence, a fluid dynamic bearing device can be suitably used in a small motor such as a spindle motor for an information apparatus such as a magnetic disk drive like an HDD, an optical disk drive for a CD-ROM, CD-R/RW, DVD-ROM/RAM or the like, or a magneto-optical disk drive for an MD, MO or the like, as a polygon scanner motor of a laser beam printer (LBP), as a motor for a projector color wheel, or as a fan motor used in a cooling fan of an electrical apparatus or the like.

For example, a fluid dynamic bearing device disclosed in Patent Document 1 includes a shaft member having a shaft portion and a flange portion, a bearing sleeve made of sintered metal and having a shaft portion inserted along an inner periphery thereof, and a housing which holds the bearing sleeve along the inner periphery thereof. In the end surface of the bearing sleeve, there is formed the thrust dynamic pressure generating portion for generating a dynamic pressure effect in a lubricating fluid in a thrust bearing gap which is formed between the end surface of the bearing sleeve and the end surface of the flange portion.

Patent Document 1: JP 2003-239951 A

SUMMARY OF THE INVENTION

Normally, the inner space of the fluid dynamic bearing device of this type is entirely filled with a lubricating fluid such as a lubricating oil. Meanwhile, in order to prevent leakage of the lubricating fluid sealed in the fluid dynamic bearing device to the outside of the bearing device, which is caused by thermal expansion, it is necessary to provide the fluid dynamic bearing device with a sealing device which exerts a buffering function for absorbing a thermal expansion of the lubricating fluid. When the inner space of the bearing device is filled with the lubricating fluid, the inside of the bearing sleeve made of sintered metal is also filled with the lubricating fluid. As a result, the total amount of the lubricating fluid in the bearing device is increased, and hence it is necessary to increase the size of the sealing device for the purpose of securing the buffering function. In contrast, when the thickness of the bearing sleeve is reduced, the total amount of the lubricating fluid which is retained in the bearing sleeve can be reduced. As a result, it is possible to reduce the capacity of the buffering function, that is, to downsize the sealing device, to thereby downsize the bearing device.

However, in accordance with the reduction in thickness of the bearing sleeve, the area of the end surface of the bearing sleeve is reduced, and hence the thrust dynamic pressure generating portion which is formed in the surface is reduced. As a result, the dynamic pressure effect is reduced, which leads to reduction in supporting force in the thrust direction.

An object of the present invention is to downsize a fluid dynamic bearing device while maintaining a supporting force in a thrust direction.

In order to achieve the above-mentioned object, a fluid dynamic bearing device according to the present invention includes:

a shaft member including a shaft portion and a flange portion;

a porous body provided with the shaft portion which is disposed along an inner periphery thereof;

a housing which holds the porous body along an inner periphery thereof;

a radial bearing gap having one axial end which constitutes an air-outlet side and another axial end which constitutes a sealed side;

a thrust bearing gap communicating with the sealed side of the radial bearing gap and facing one end surface of the flange portion of the shaft portion; and a thrust dynamic pressure generating portion facing the thrust bearing gap, for exerting a dynamic pressure effect of a lubricating fluid, and is characterized in that at least a part of an outer peripheral surface of the porous body is positioned on a radially inside with respect to the thrust dynamic pressure generating portion.

As described above, in the present invention, at least the part of the outer peripheral surface of the porous body is positioned on the radially inside with respect to the thrust dynamic pressure generating portion. In this case, even when the thickness of a part of or the entire of the bearing sleeve is reduced, there can be secured the thrust dynamic pressure generating portion, which has a thrust load capacity equivalent to that in the conventional case where the thrust dynamic pressure generating portion is formed in the end surface of the bearing sleeve. Accordingly, it is possible to reduce the thickness of at least the part of the porous body without sacrificing a bearing performance in a thrust direction. With this structure, a total amount of a lubricating oil sealed in a bearing device can be reduced, thereby reducing a volume of a seal space which exerts a buffering function so as to downsize a sealing device, and by extension, downsizing the bearing device.

The thrust dynamic pressure generating portion can be provided to, for example, an end surface of the housing or the end surface of the flange portion.

Further, when there is provided an axial through-hole which is formed through the flange portion so as to open in both the end surfaces thereof, it is possible to communicate the lubricating fluid in each of the spaces with which both the end surfaces of the flange portion are respectively faced. As a result, the pressure balance can be properly maintained in the space on the closed side of the housing, in which the negative pressure is liable to be generated.

Still further, when there is used the pump-out thrust dynamic pressure generating portion which allows the lubricating fluid to flow radially outward, it is possible to positively supply the lubricating oil into the space on the outer diameter side, in which the negative pressure is particularly liable to be generated. As a result, the generation of the negative pressure can be more effectively prevented.

The effect of the invention is described as follows. As described above, according to the present invention, it is possible to downsize the fluid dynamic bearing device while maintaining the supporting force in the thrust direction.

DETAILED DESCRIPTION OF THE INVENTION

In the following, embodiments of the present invention are described.

Figure 1:
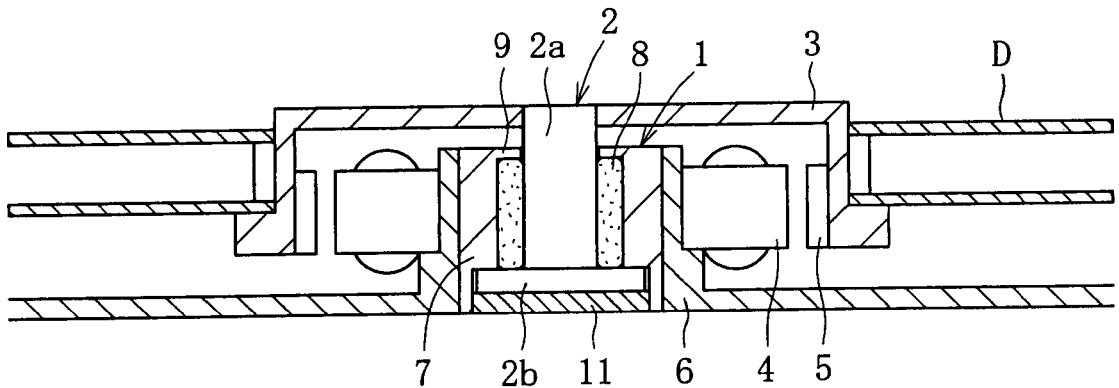
FIG. 1 is a sectional view of a spindle motor in which a fluid dynamic bearing device 1 is incorporated.

FIG. 1 illustrates a construction example of a spindle motor for an information apparatus, in which a fluid dynamic bearing device 1 according to a first embodiment of the present invention is incorporated. This spindle motor is used for the disk drive such as an HDD, and includes the fluid dynamic bearing device 1 for rotatably supporting a shaft member 2 in a non-contact manner, a disk hub 3 mounted to the shaft member 2, a bracket 6 mounted to the outer periphery of the fluid dynamic bearing device 1, a motor stator 4 and a motor rotor 5 opposed to each other through an intermediation of, for example, a radial gap. The motor stator 4 is mounted to the outer peripheral surface of the bracket 6, and the motor rotor 5 is mounted to the inner periphery of the disk hub 3. One or multiple disks D such as magnetic disks are held on the disk hub 3. When the motor stator 4 is energized, the motor rotor 5 is rotated by means of an electromagnetic force between the motor stator 4 and the motor rotor 5, whereby the disk hub 3 and the shaft member 2 are integrally rotated.

Figure 2:
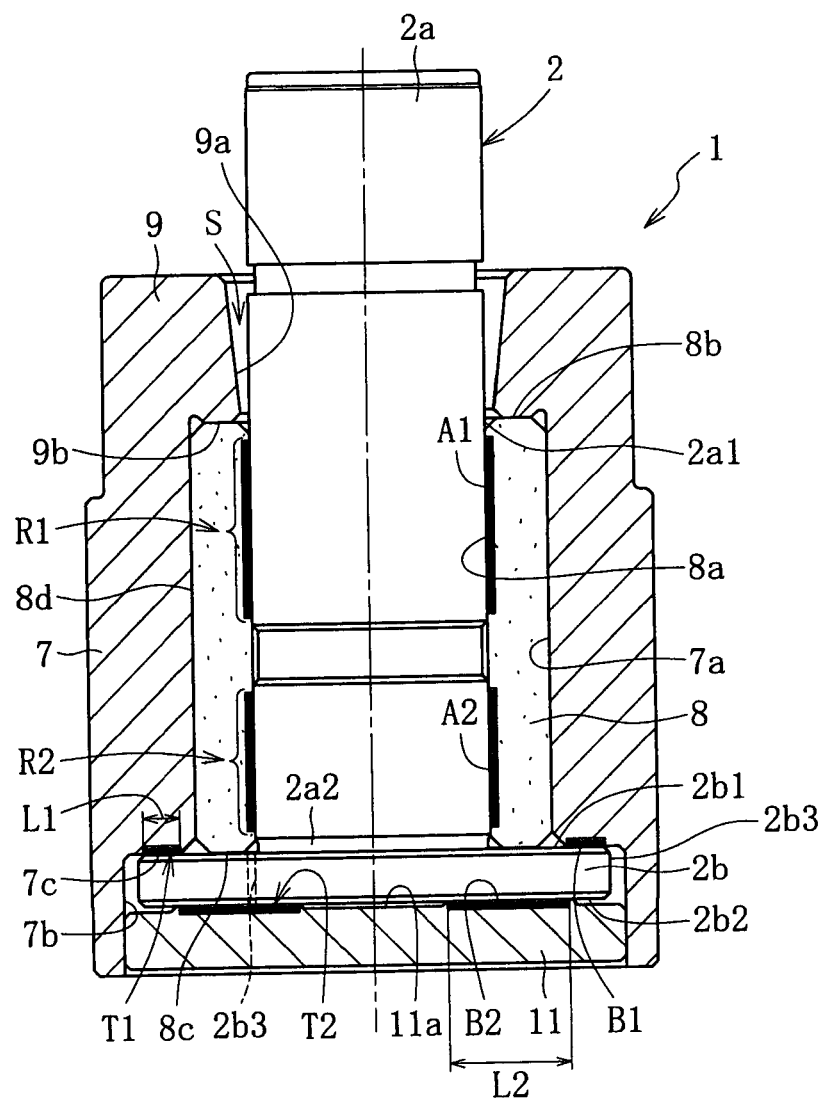
FIG. 2 is a sectional view of the fluid dynamic bearing device 1.

FIG. 2 illustrates the fluid dynamic bearing device 1. This fluid dynamic bearing device 1 includes a housing 7 opening at both axial ends, a lid member 11 for closing an opening portion at one end of the housing 7, a bearing sleeve 8 fixed to an inner periphery of the housing 7 and serving as a porous body, and the shaft member 2 disposed along the inner periphery of the bearing sleeve 8. Note that, for the sake of convenience in description, description is made on the assumption that the side on which the housing 7 is closed by means of the lid member 11 is a lower side, and the side opposite thereto is an upper side.

The shaft member 2 has a shaft portion 2a and a flange portion 2b provided at the lower end of the shaft portion 2a, and is integrally or separately made of metal material such as stainless steel. The portions of the shaft member 2 may be made of material of the same type, or may be made of other materials. For example, the shaft portion 2a may be made of metal, and a part or the entire of the flange portion 2b may be made of resin. In this case, it is possible to manufacture the shaft member 2 by resin injection molding in which the shaft portion 2a is used as an insert component.

An outer peripheral surface 2a1 of the shaft portion 2a is opposed to an inner peripheral surface 8a of the bearing sleeve 8. An upper end surface 2b1 of the flange portion 2b is opposed to a lower end surface 8c of the bearing sleeve 8 and to a shoulder surface 7c of the housing 7. And a lower end surface 2b2 of the flange portion 2b is opposed to an upper end surface 11a of the lid member 11.

The flange portion 2b is provided with an axial through-hole 2b3 at one or multiple portions (multiple portions in the circumferential direction, for example). The axial through-hole 2b3 communicates the upper end surface 2b1 and the lower end surface 2b2 with each other. In order to reduce the influence on the thrust bearing gap, it is desirable for the through-hole 2b3 to be formed to have a diameter as small as possible within a range through which the lubricating fluid is allowed to flow and in which a pressure balance is taken on both sides of the flange portion 2b, and to be provided as radially inside as possible in the flange portion 2b. For example, as illustrated in FIG. 2, the upper end opening portion of for the through-hole 2b3 can be provided at the position which is open to the space defined by an inner peripheral chamfer on the lower end side of the bearing sleeve 8 and a grooved portion 2a2 provided at the lower end of the shaft portion 2a.

The bearing sleeve 8 is made of porous material. In this embodiment, the bearing sleeve is formed in a cylindrical shape with use of a porous body made of sintered metal including copper as a main component. The bearing sleeve 8 is fixed to a predetermined position of the small diameter inner peripheral surface 7a of the housing 7 by press-fitting, bonding, press-fitting with an adhesive therebetween, or the like. Note that, a porous material of which the bearing sleeve 8 is formed is not limited thereto. For example, it is possible to arbitrarily use any other materials having porosity, such as a sintered metal including a metal other than copper as a main component, a porous resin, or porous ceramic.

Figure 3:
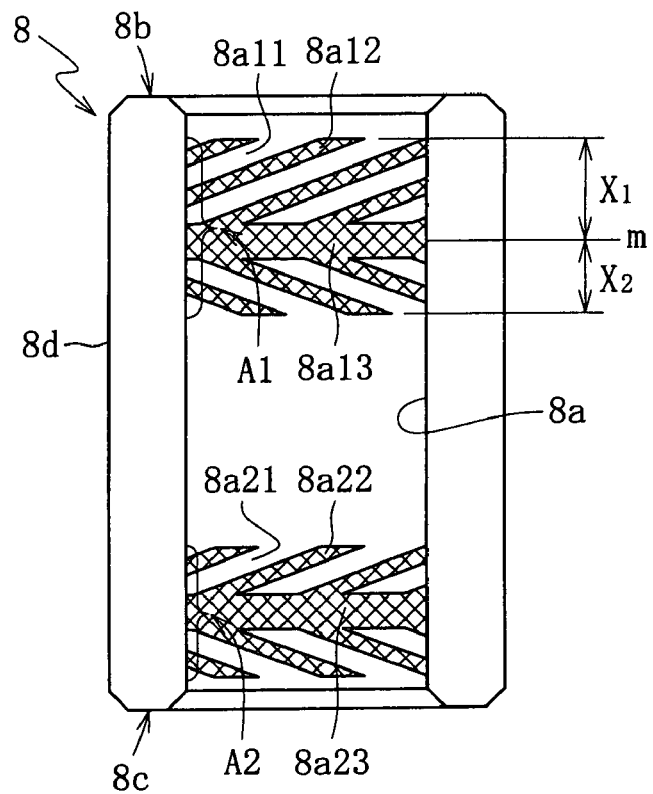
FIG. 3 is a sectional view of a bearing sleeve 8.

As illustrated in FIG. 3, for example, an inner peripheral surface 8a of the bearing sleeve 8 is provided with a first radial dynamic pressure generating portion A1 and a second radial dynamic pressure generating portion A2 which are separated from each other in the axial direction. The first radial dynamic pressure generating portion A1 includes a herringbone dynamic pressure groove 8a11, a backbone portion 8a12 formed between the dynamic pressure grooves 8a11, and an annular portion 8a13 formed between the dynamic pressure grooves 8a11 in the axial direction. The backbone portion 8a12 and the annular portion 8a13 are continuously formed in the same cylindrical surface. Similarly, the second radial dynamic pressure generating portion A2 includes a herringbone dynamic pressure groove 8a21, a backbone portion 8a22, and an annular portion 8a13. The dynamic pressure groove 8a11 of the first radial dynamic pressure generating portion A1 is formed asymmetrically in the axial direction with respect to an axial center m (axial center of the region between the upper and lower inclined grooves), and an axial dimension X1 in the upper region with respect to the axial center m is larger than an axial dimension X2 in the lower region. When the shaft member 2 is rotated, a radial bearing gap is formed between each of the first and second radial dynamic pressure generating portions A1 and A2 and the outer peripheral surface 2a1 of the shaft member 2. Note that, the first and second radial dynamic pressure generating portions A1 and A2 are not necessarily spaced apart from each other in the axial direction, and may be continuously provided in the axial direction, for example. Alternatively, only one of the first and second radial dynamic pressure generating portions A1 and A2 may be formed.

An upper end surface 8b of the bearing sleeve 8 is brought into contact with a lower end surface 9b of a sealing portion 9 provided to the housing 7. As a result, the bearing sleeve 8 is positioned with respect to the housing 7. In this case, the lower end surface 8c of the bearing sleeve 8 is opposed to the upper end surface 2b1 of the flange portion 2b, and is positioned at the same height as that of the shoulder surface 7c or thereabove. With this structure, torque increase which is caused by contact between the upper end surface 2b1 of the flange portion 2b and the lower end surface 8c of the bearing sleeve 8 during the rotation of the shaft member 2 can be prevented.

The housing 7 is formed in a substantially cylindrical shape so as to open at both axial ends thereof. The housing 7 is provided integrally with a sealing portion 9 for sealing the upper end opening portion. The housing 7 has the small diameter inner peripheral surface 7a, and has a large diameter inner peripheral surface 7b provided at the lower end opening portion. And the housing 7 has the radial shoulder surface 7c formed between the small diameter inner peripheral surface 7a and the large diameter inner peripheral surface 7b. The bearing sleeve 8 is fixed to the small diameter inner peripheral surface 7a, and the lid member 11 is fixed to the large diameter inner peripheral surface 7b. Note that, the sealing portion 9 may be formed separately from the housing 7.

The housing 7 and the sealing portion 9 are formed by injection molding of a resin composition with a base resin formed of a crystalline resin such as liquid crystal polymer (LCP), polyphenylene sulfide (PPS), and polyetherether ketone (PEEK), or of an amorphous resin such as polyphenyl sulfone (PPSU), polyether sulfone (PES), and polyether imide (PEI). There are no particular limitations regarding the type of filler used with the above-mentioned resins. Examples of the filler that can be used include fibrous fillers such as glass fiber, whisker-like fillers such as potassium titanate, scale-like fillers such as mica, and fibrous or powdered conductive fillers such as carbon fiber, carbon black, graphite, carbon nanomaterial, and metal powder. Those fillers may be used singly or in a combination of two or more kinds. Note that, the housing 7 and the sealing portion 9 can also be formed of a metal material such as an elastic metal instead of a resin as described above.

Figure 4:
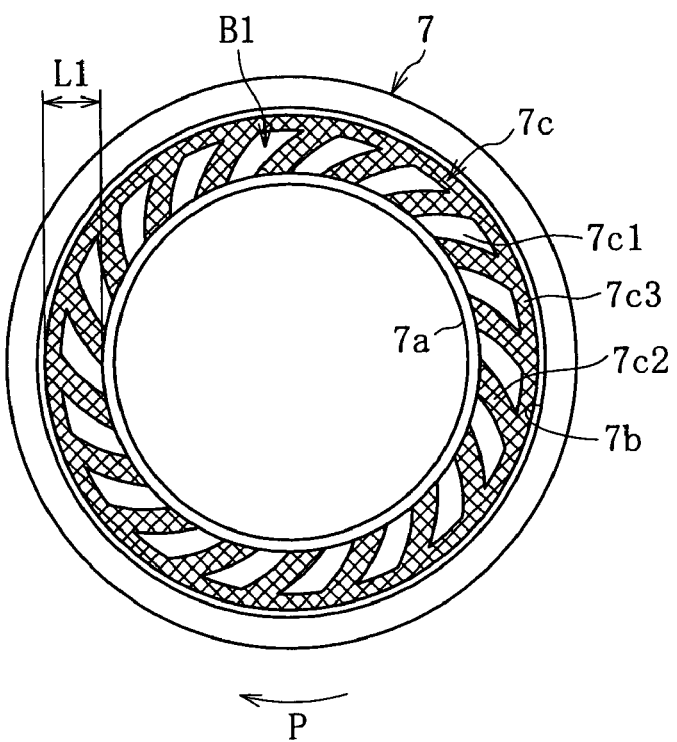
FIG. 4 is a bottom view of a housing 7.

As illustrated in FIG. 4, the shoulder surface 7c of the housing 7 is provided with a first thrust dynamic pressure generating portion B1. The first thrust dynamic pressure generating portion B1 includes, a pump-out dynamic pressure groove 7c1 spirally shaped in a rotational direction of the shaft member 2 (indicated by arrow P in FIG. 4), a backbone portion 7c2 formed between the dynamic pressure grooves 7c1, and an annular portion 7c3 formed on the radially outside with respect to the dynamic pressure groove 7c1. The backbone portion 7c2 and the annular portion 7c3 are continuously formed in the same plane. A radial dimension L1 of the first thrust dynamic pressure generating portion B1 (distance between the outer diameter end of annular portion 7c3 and the inner diameter end of backbone portion 7c2, refer to FIG. 4) is smaller than a radial dimension L2 of the second thrust dynamic pressure generating portion B2 (distance between the outer diameter end of annular portion 11a3 and the inner diameter end of backbone portion 11a2, refer to FIG. 5) (L1<L2, refer to FIG. 2). As described later, the second thrust dynamic pressure generating portion B2 is formed in the upper end surface 11a of the lid member 11. When the shaft member 2 is rotated, the first thrust dynamic pressure generating portion B1 is opposed to the region in the vicinity of the outer diameter end of the upper end surface 2b1 of the flange portion 2b through an intermediation of the thrust bearing gap. As a result, reduction in friction at the time of contact sliding can be achieved in the case where the flange portion 2b is opposed to the housing 7 made of resin through the intermediation of the thrust bearing gap, when compared with that in the case where the flange portion 2b is opposed to the bearing sleeve 8 made of sintered metal through the intermediation of the thrust bearing gap.

An inner peripheral surface 9a of the sealing portion 9 is formed in a tapered surface gradually increased in diameter upward. When the shaft member 2 is rotated, a seal space S gradually reduced in radial dimension downward is formed between the inner peripheral surface 9a and the outer peripheral surface 2a1 of the shaft portion 2a. With use of a capillary force of the seal space S, leakage of the lubricating oil which is retained in the bearing device to the outside thereof is prevented. Within the operating temperature limit of the bearing device, the volume of the seal space S is set to be larger than the thermal expansion volume of the lubricating oil retained in the bearing device. With this configuration, the lubricating oil does not leak through the seal space S within the operating temperature limit of the bearing device, and the oil surface is constantly retained within the seal space S (buffer function). Note that, contrary to the illustration in the figure, the inner peripheral surface 9a of the sealing portion 9 may be formed as a cylindrical surface, and the outer peripheral surface 2a1 opposed thereto of the shaft portion 2a may be formed as a tapered surface gradually reduced upward in diameter. With this structure, the seal space S may be allowed to serve as a centrifugal seal when the shaft member 2 is rotated.

Figure 5:
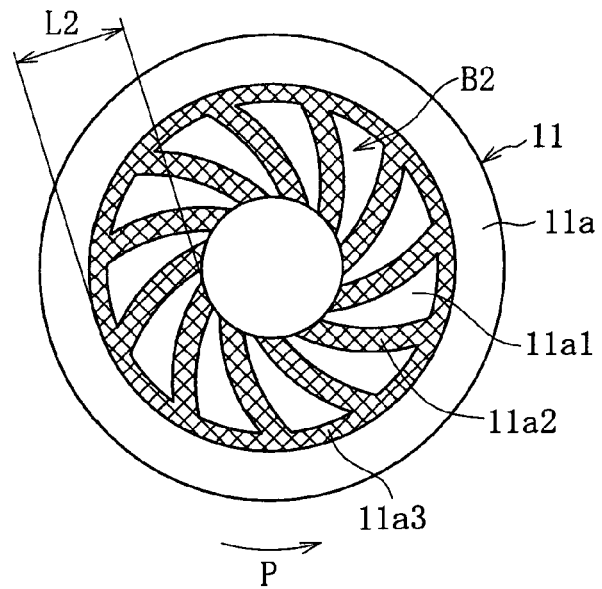
FIG. 5 is a top view of a cover member 11.

The lid member 11 is made of metal, resin, or the like so as to be formed in a substantially disk shape. For example, as illustrated in FIG. 5, the upper end surface 11a of the lid member 11 is provided with the second thrust dynamic pressure generating portion B2. The second thrust dynamic pressure generating portion B2 includes a pump-out dynamic pressure groove 11a1 spirally shaped in the rotational direction of the shaft member 2 (indicated by allow P in FIG. 5), a backbone portion 11a2 formed between the dynamic pressure grooves 11a1, and an annular portion 11a3 formed radially outside with respect to the backbone portion. The backbone portion 11a2 and the annular portion 11a3 are continuously formed in the same plane. When the shaft member 2 is rotated, the second thrust dynamic pressure generating portion B2 is opposed to, through the intermediation of the thrust bearing gap, the region apart from the outer diameter end of the lower end surface 2b2 of the flange portion 2b and on the radially inside with respect to the outer diameter end (refer to FIG. 2).

The lubricating oil is supplied in the fluid dynamic bearing device 1 having the above-mentioned structure from the seal space S. And the whole inner space of the fluid dynamic bearing device 1 including the inner air-hole of the bearing sleeve 8 is filled with the lubricating oil. In this manner, the bearing device illustrated in FIG. 2 is completed. Examples of the applicable lubricating oil include ones of various types, such as dioctyl sebacate (DOS) and dioctyl azelate (DOZ).

When the shaft member 2 is rotated, by means of the dynamic pressure grooves 8a11 and 8a21 of the respective first and second radial dynamic pressure generating portions A1 and A2 formed in the inner peripheral surface 8a of the bearing sleeve 8, the lubricating oil flows toward the axial center of each of the dynamic pressure grooves. As a result, the pressure of the lubricating oil is increased in the annular portions 8a13 and 8a23. Owing to the dynamic pressure effect of the first and second radial dynamic pressure generating portions A1 and A2 as described above, there are formed radial bearing portions R1 and R2 which rotatably support the shaft portion 2a of the shaft member 2 in a radial direction in a non-contact manner. Simultaneously, by means of the dynamic pressure groove 7c1 of the first thrust dynamic pressure generating portion B1, which is formed in the shoulder surface 7c of the housing 7, the lubricating oil flows radially outward. As a result, the pressure of the lubricating oil is increased in the annular portion 7c3. Further, by means of the dynamic pressure groove 11a1 of the second thrust dynamic pressure generating portion B2, which is formed in the upper end surface 11a of the lid member 11, the lubricating oil flows radially inside. As a result, the pressure of the lubricating oil is increased in the annular portion 11a3. Owing to the dynamic pressure effect of the first and second thrust dynamic pressure generating portions B1 and B2 as described above, there are formed thrust bearing portions T1 and T2 which rotatably support the shaft member 2 in a thrust direction in a non-contact manner.

As described above, in the fluid dynamic bearing device 1 of the present invention, the first thrust dynamic pressure generating portion B1 is formed in the shoulder surface 7c of the housing 7, that is, formed radially outside with respect to an outer peripheral surface 8d of the bearing sleeve 8. In this case, even when the thickness of the bearing sleeve 8 is reduced, it is possible to secure the first thrust dynamic pressure generating portion B1 which has a thrust load capacity equivalent to that in the conventional case where the thrust dynamic pressure generating portion is formed in the end surface of the bearing sleeve. Accordingly, it is possible to reduce the thickness of the bearing sleeve 8 without sacrificing the bearing performance in the thrust direction. With this structure, the total amount of the lubricating oil sealed in the bearing device can be reduced, thereby reducing the capacity of a buffering function so as to downsize the sealing portion 9, and by extension, downsizing the fluid dynamic bearing device 1.

Further, the flange portion 2b is provided with the through-hole 2b3 passing through both the end surfaces 2b1 and 2b2, whereby it is possible to communicate with each other the spaces which both the end surfaces 2b1 and 2b2 face. Specifically, it is possible to communicate the space formed of the inner peripheral chamfer on the lower end side of the bearing sleeve 8 and the grooved portion 2a2 formed at the lower end of the shaft portion 2a with the thrust bearing gap of the second thrust bearing portion T2. With this structure, it is possible to properly maintain the pressure balance in the space on the closed side of the housing 7, in which the negative pressure is liable to be generated. Still further, when the shaft member 2 is rotated, the lubricating oil in the thrust bearing gaps of the first and second thrust bearing portions T1 and T2 flows radially outward by means of the pump-out spiral dynamic pressure grooves 7c1 and 11a1. And the lubricating oil flow into the gap between the outer peripheral surface of the flange portion 2b and the large diameter inner peripheral surface 7b of the housing 7. As described above, by using the pump-out first and second thrust dynamic pressure generating portions B1 and B2, it is possible to positively supply the lubricating oil into the space between the large diameter inner peripheral surface 7b of the housing 7 and the outer peripheral surface of the flange portion 2b, in which the negative pressure is particularly liable to be generated. As a result, the generation of the negative pressure can be more effectively prevented.

Further, as illustrated in FIG. 2, the bearing sleeve 8 includes the inner peripheral surface 8a which faces the radial bearing gaps and the lower end surface 8c which communicates with the thrust bearing gap of the first thrust bearing portion T1 through an intermediation of the gap formed between the upper end surface 2b1 of the flange portion 2b and the lower end surface 8c. The bearing sleeve 8 is formed of a porous material, whereby the lubricating oil oozed out from the bearing sleeve 8 is constantly supplied into the radial bearing gaps and the thrust bearing gaps. As a result, it is possible to prevent the generation of the bubbles caused by the negative pressure and to secure the stable lubrication. In this embodiment, the dynamic pressure groove 8a11 of the first radial dynamic pressure generating portion A1 is formed asymmetrically in the axial direction with respect to the axial center m, whereby the axial dimension X1 in the upper region with respect to the axial center m is larger than the axial dimension X2 in the lower region with respect thereto (refer to FIG. 3). Therefore, when the shaft member 2 is rotated, a drawing-in force (pumping force) to the lubricating oil generated by the dynamic pressure groove 8a11 is relatively large in the upper region as compared with that in the lower region. In this context, due to differential pressure caused by the drawing-in force, the lubricating oil filled in the radial bearing gap of the first radial bearing gap R1 flows downwards. As described above, the lubricating oil in the radial bearing gap is forced to flow so as to be supplied into the space on the closed side of the housing, in which the negative pressure is liable to be generated, whereby the effect of preventing a negative pressure generation is enhanced. Note that, when it is unnecessary for the lubricating oil to be forced to flow in the radial bearing gaps as described above, the shape of the dynamic pressure groove 8a11 may be symmetric in the axial direction with respect to the axial center m.

The embodiment of the present invention is not limited to the above-mentioned one. Other embodiments of the present invention are described in the following. Note that, in the following description, the parts having the same structures and functions as those in above-mentioned embodiment are denoted by the same reference symbols, and the description thereof is omitted.

Figure 6:
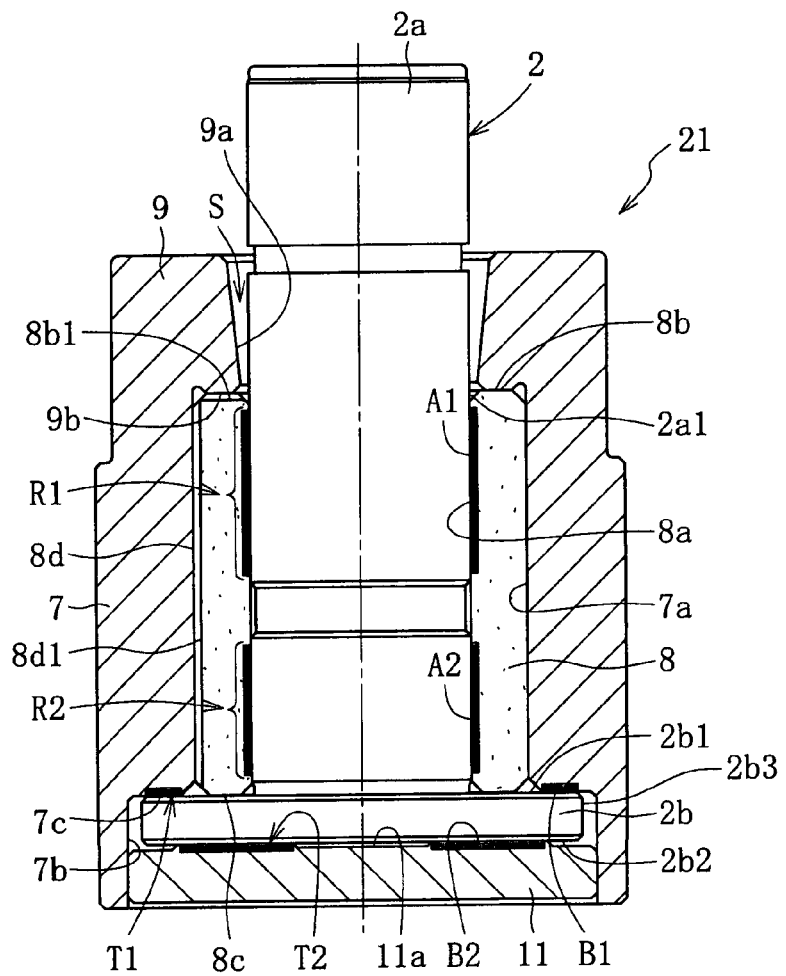
FIG. 6 is a sectional view of a fluid dynamic bearing device 21.

FIG. 6 illustrates a fluid dynamic bearing device 21 according to a second embodiment of the present invention. In this embodiment, one or multiple axial grooves 8d1 are formed in the outer peripheral surface 8d of the bearing sleeve 8, and a radial groove 8b1 is formed on the upper end surface 8b. The radial groove 8b1 is disposed at the same circumferential position as the axial grooves 8d1. The lubricating oil in the radial bearing gaps, which is pressed downward by means of the dynamic pressure grooves formed in the inner peripheral surface 8a of the bearing sleeve 8, circulates through the path constituted by the gap between the lower end surface 8c of the bearing sleeve 8 and the upper end surface 2b1 of the flange portion 2b, the axial groove 8d1, the radial groove 8b1 in the stated order so as to be drawn into the radial bearing gap again. As a result of the circulation of the lubricating oil, the generation of the negative pressure is prevented in the bearing. Note that, those axial grooves and the radial grooves may be formed on the housing 7 side.

Figure 7:
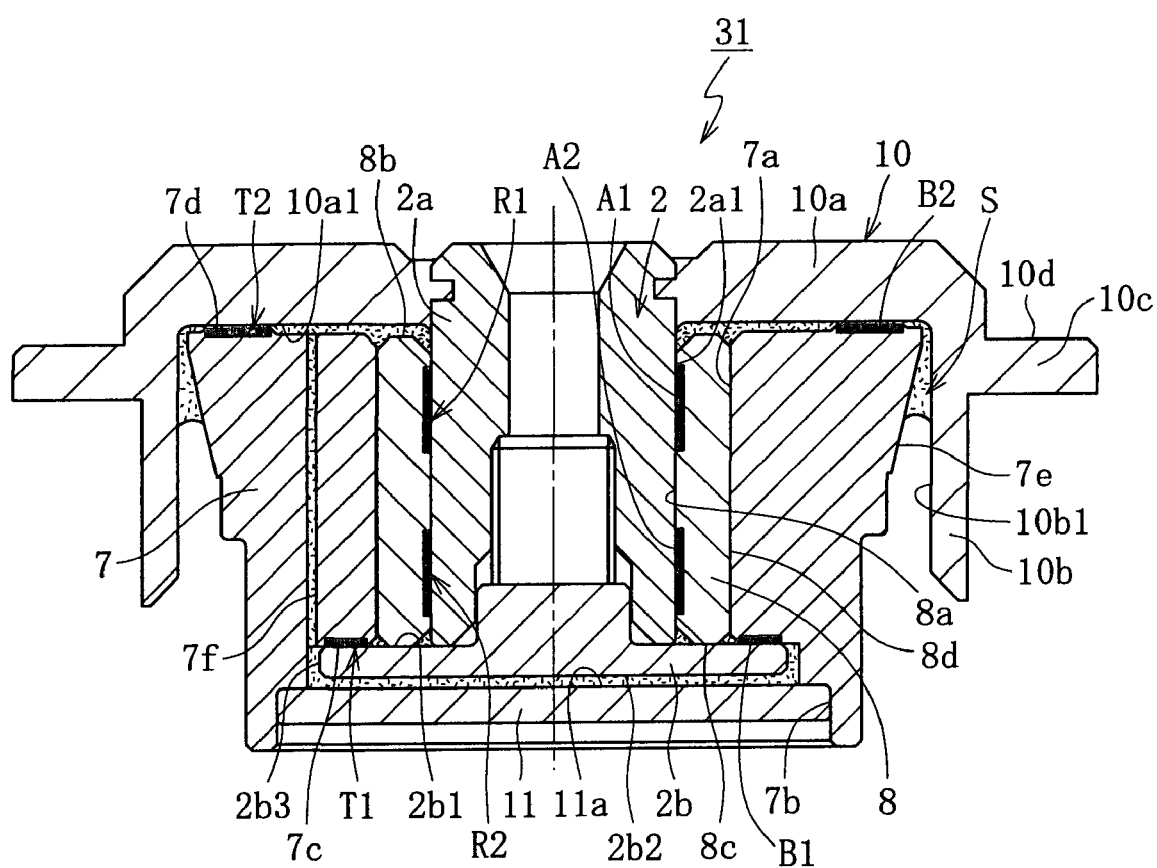
FIG. 7 is a sectional view of a fluid dynamic bearing device 31.

FIG. 7 illustrates a fluid dynamic bearing device 31 according to a third embodiment of the present invention. In the fluid dynamic bearing device 31, the second thrust bearing portion T2 is formed between a disk hub 10 provided on the upper end of the shaft member 2 and the housing 7. The disk hub 10 includes a disk portion 10a for covering the opening portion of the housing 7, a cylindrical portion 10b extending downward from the outer diameter end of the disk portion 10a, and a brim portion 10c protruding from the cylindrical portion 10b to the outer diameter. The upper end surface of the brim portion 10c constitutes a disk mounting surface 10d for mounting a disk (not shown). In an upper end surface 7d of the housing 7, a spiral dynamic pressure groove (not shown) is formed as the second thrust dynamic pressure generating portion B2. When the shaft member 2 is rotated, the second thrust dynamic pressure generating portion B2 generates the dynamic pressure effect in the lubricating oil in the thrust bearing gap which is formed between a lower end surface 10a1 of the disk portion 10a of the disk hub 10 and the upper end surface 7d of the housing 7, whereby the disk hub 10 and the shaft member 2 are supported in the thrust direction. In this case, an inner peripheral surface 10b1 of the cylindrical portion 10b of the disk hub 10 and a tapered surface 7e provided above the outer peripheral surface of the housing 7 form the seal space S which communicates with the outer diameter end of the thrust bearing gap of the second thrust bearing portion T2.

Further, in the housing 7, there are formed one or multiple through-holes 7*f* for communicating the space which the upper end surface 7*d* faces with the space which the shoulder surface 7*c* faces. With this structure, the lubricating oil filled in the bearing device can be circulated through the radial bearing gap, the gap between the flange portion 2*b* and the lower end surface 8*c* of the bearing sleeve 8, the thrust bearing gap of the first thrust bearing portion T1, the through-holes 7*f*, the gap between the lower end surface 10*a*1 of the disk portion 10*a* of the disk hub 10 and both an upper end surface of the housing 7 and the upper end surface 8*b* of the bearing sleeve 8 in the stated order. As a result, it is possible to properly maintain the pressure balance of the lubricating oil in the bearing device.

Figure 8:
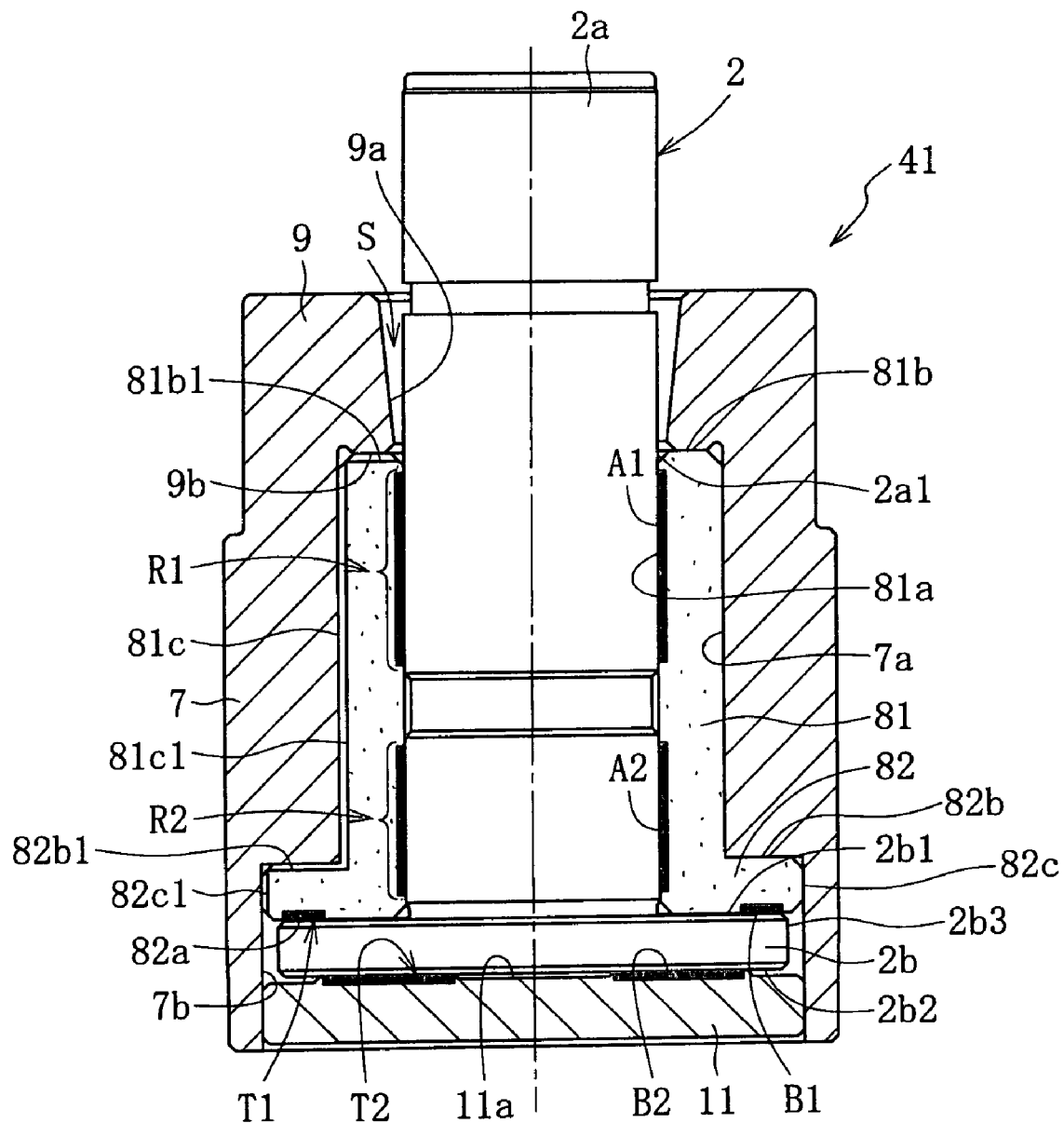
FIG. 8 is a sectional view of a fluid dynamic bearing device 41.

FIG. 8 illustrates a fluid dynamic bearing device 41 according to a fourth embodiment of the present invention. In this embodiment, a porous body is integrally formed with a cylindrical portion 81 and a brim-shaped portion 82 protruding from the lower end of the cylindrical portion 81 toward the outer diameter. An inner peripheral surface 81*a* of the cylindrical portion 81 is provided with the radial dynamic pressure generating portions A1 and A2, and a lower end surface 82*a* of the brim-shaped portion 82 is provided with the thrust dynamic pressure generating portion B1. An outer peripheral surface 81*c* of the cylindrical portion 81 is positioned radially inside with respect to the thrust dynamic pressure generating portion B1. With this structure, the porous body faces the thrust bearing gap of the first thrust bearing portion T1, whereby the lubrication of this portion is improved. Note that the cylindrical portion 81 and the brim-shaped portion 82 which form the porous body may be integrally formed as described above, or may be separately formed.

In the fluid dynamic bearing device 41, a radial groove 81*b*1 is formed in an upper end surface 81*b* of the cylindrical portion 81, an axial groove 81*c*1 is formed in an outer peripheral surface 81*c* of the cylindrical portion 81, a radial groove 82*b*1 is formed in an upper end surface 82*b* of the brim-shaped portion 82, and an axial groove 82*c*1 is formed in an outer peripheral surface 82*c* of the brim-shaped portion 82, each of which is formed at one or multiple parts in the circumferential direction. By means of those grooves, the upper end of the radial bearing gap of the radial bearing portion R1 is allowed to communicate with the outer diameter end of the thrust bearing gap of the thrust bearing portion T1, whereby it is possible to properly maintain the pressure balance in the lubricating oil in the bearing device. Note that those axial grooves and the radial grooves may be formed on the housing 7 side.

The flow path of the lubricating oil, which is formed for maintaining the pressure balance in the bearing device, can be constituted by the through-hole 2*b*3 (refer to FIG. 2) formed in the flange portion 2*b*, the axial groove 8*d*1 and the radial groove 8*b*1 (refer to FIGS. 6 and 8) formed in the bearing sleeve 8 (porous body), or the through-hole 7*f* (refer to FIG. 7) formed in the housing 7, or a through-hole which is provided in the shaft portion 2*a*. Further, the above-mentioned multiple methods may be combined with each other. The determination as to which of those methods is adopted for forming the flow path can be appropriately made in consideration of the forming method, the pressure balance, and the like.

In the above-mentioned embodiments, the herringbone dynamic pressure grooves are formed as the first and second radial dynamic pressure generating portions A1 and A2. However, this should not be construed restrictively. For example, it is possible to adopt a spiral dynamic pressure groove, a step groove bearing, or a multi-arc bearing.

Further, in the above-mentioned embodiments, the pump-out spiral dynamic pressure grooves are formed as the first and second thrust dynamic pressure generating portions B1 and B2. However, the determination can be appropriately made in consideration of the pressure balance of the lubricating oil in the bearing device, as to which of the pump-out type or the pump-in type is adopted as the shape of the dynamic pressure generating portions. In addition, the types of the dynamic pressure generating portion are not limited to the above-mentioned ones. For example, it is also possible to adopt a herringbone dynamic pressure groove, a step groove bearing, or a corrugated groove bearing (step groove bearing having a corrugated shape).

Still further, in the above-mentioned embodiments, there are described the cases in which the dynamic pressure generating portion is formed in the inner peripheral surface 8*a* of the bearing sleeve 8, the shoulder surface 7*c* of the housing 7, the upper end surface 11*a* of the lid member 11 of the housing 7, or the upper end surface 7*d* of the housing 7. However, the dynamic pressure generating portion may be formed in the surface opposed thereto through the intermediation of the gap, that is, in the outer peripheral surface 2*a*1 of the shaft portion 2*a*, the upper end surface 2*b*1 or the lower end surface 2*b*2 of the flange portion 2*b*, or in the lower end surface 10*a*1 of the disk portion 10*a* of the disk hub 10.

Yet further, in the above-mentioned embodiments, the lubricating oil is used as the lubricating fluid filled in the bearing device. However, this should not be construed restrictively. For example, it is also possible to use a lubricating grease, a magnetic fluid, or a gas such as air.

Yet further, the fluid dynamic bearing device of the present invention is not limited as described above to a spindle motor to be used in a disk drive such as an HDD. The fluid dynamic bearing device of the present invention is also suitably applicable to the support of the rotary shaft of a small motor for an information apparatus used under high speed rotating condition, such as a spindle motor for driving an optical disk or a magneto-optical disk, the rotary shaft of a polygon scanner motor in a laser beam printer, or to the support of the rotary shaft of a fan motor for a cooling fan of an electrical apparatus.

In the embodiments according to the present invention, reference characters are designated as follows:

1 fluid dynamic bearing device
2 shaft member
2*a* shaft portion
2*b* flange portion
2*b*3 through-hole
7 housing
8 bearing sleeve
9 sealing portion
R1, R2 radial bearing portion
A1, A2 radial dynamic pressure generating portion
T1, T2 thrust bearing portion
B1, B2 thrust dynamic pressure generating portion
S seal space

The invention claimed is:

1. A fluid dynamic bearing device, comprising:
   a shaft member including a shaft portion and a flange portion;
   a porous body formed in a cylindrical shape and provided with the shaft portion which is disposed along an inner periphery of the cylindrical shape, an end surface of the porous body being opposed to one end surface of the flange portion;
   a housing made of a resin which has a small diameter inner peripheral surface, a large diameter inner peripheral surface, and a radial shoulder surface formed between the small diameter inner peripheral surface and the large diameter inner peripheral surface, the small diameter inner peripheral surface holding an outer peripheral surface of the porous body, the radial shoulder surface being opposed to the one end surface of the flange portion;

a radial bearing gap having one axial end which constitutes an air-outlet side and another axial end which constitutes a sealed side;

a thrust bearing gap which is formed between the one end surface of the flange portion of the shaft portion and the radial shoulder surface of the housing and which is communicating with the another axial end side of the radial bearing gap; and a thrust dynamic pressure generating portion facing the thrust bearing gap, for exerting a dynamic pressure effect of a lubricating fluid, wherein the outer peripheral surface of the porous body is positioned on a radially inside with respect to the thrust dynamic pressure generating portion, and wherein the end surface of the porous body is positioned at substantially a same axial location as the radial shoulder surface of the housing.

2. A fluid dynamic bearing device according to claim 1, wherein the thrust dynamic pressure generating portion is provided to the radial shoulder surface of the housing or the one end surface of the flange portion.

3. A fluid dynamic bearing device according to claim 1, wherein the flange portion has an axial through-hole which is open in the both end surfaces thereof.

4. A fluid dynamic bearing device according to claim 1, wherein the thrust dynamic pressure generating portion is a pump-out thrust dynamic pressure generating portion which allows the lubricating fluid to flow radially outward.

* * * * *